(12) United States Patent
Berger et al.

(10) Patent No.: US 8,151,412 B2
(45) Date of Patent: Apr. 10, 2012

(54) CASTER WITH HIGH-STRENGTH AXLE CARRIER

(75) Inventors: Ernst Berger, Jettingen (DE); Ralph von Bordelius, Herrenberg (DE)

(73) Assignee: Gross + Froelich GmbH & Co. KG, Weil der Stadt (DE)

( * ) Notice: Subject to any disclaimer, the term of this patent is extended or adjusted under 35 U.S.C. 154(b) by 0 days.

(21) Appl. No.: 11/975,719

(22) Filed: Oct. 19, 2007

(65) Prior Publication Data
US 2008/0141487 A1    Jun. 19, 2008

(30) Foreign Application Priority Data
Oct. 21, 2006   (DE) .......................... 10 2006 049 725

(51) Int. Cl.
*B60B 33/00* (2006.01)
(52) U.S. Cl. .......................................... 16/47; 16/35 R
(58) Field of Classification Search ............... 16/47, 19, 16/20, 23, 30, 37, 38, 18 R, 45, 31 R, 39; 280/301, 5.52, 5.521, 11.19, 86.751; 297/271.2; 5/86.1
See application file for complete search history.

(56) References Cited

U.S. PATENT DOCUMENTS

| | | | | |
|---|---|---|---|---|
| 19,369 A * | 2/1858 | Kinzer | ........................ | 16/18 R |
| 632,166 A * | 8/1899 | Berninghaus et al. | ............ | 16/47 |
| 1,385,947 A * | 7/1921 | Kalberer et al. | ............. | 16/18 R |
| 4,120,071 A | 10/1978 | Crescenzi | | |
| 4,854,008 A * | 8/1989 | Kuo | ................................. | 16/30 |
| 5,276,941 A * | 1/1994 | Chen | ............................... | 16/47 |
| 6,256,835 B1 * | 7/2001 | Wang | ............................ | 16/35 R |
| 7,200,895 B2 * | 4/2007 | Dayt | ............................... | 16/47 |
| 2002/0178540 A1 * | 12/2002 | Holbrook et al. | ............. | 16/18 R |

FOREIGN PATENT DOCUMENTS

| | | |
|---|---|---|
| DE | 27 21 388 A1 | 12/1977 |
| DE | 78 32 768 U1 | 2/1979 |

OTHER PUBLICATIONS

Germany Patent Office Search Report dated May 30, 2007 (4 pages).

* cited by examiner

*Primary Examiner* — Victor Batson
*Assistant Examiner* — Emily Morgan
(74) *Attorney, Agent, or Firm* — Flynn, Thiel, Boutell & Tanis, P.C.

(57) ABSTRACT

A caster, in particular a free-running caster is provided. The caster includes twinned wheels and a housing with a substantially vertically aligned upper-side journal opening for holding a rotary journal which connects the caster to an item of furniture or to some other object. The caster also has an axle bolt which extends through the housing transversely with respect to the journal opening and supports the wheels. In order to permit cost-effective production with sufficient load capacity in the region of the axle receptacle, an axle carrier having a passage opening for the axle bolt is arranged in the housing. The axle carrier is composed of a material with a higher strength than the housing.

24 Claims, 1 Drawing Sheet

CASTER WITH HIGH-STRENGTH AXLE CARRIER

FIELD OF THE INVENTION

The invention relates to a caster, in particular free-running caster, having twinned wheels, and a housing with a substantially vertically aligned upper-side journal opening for holding a rotary journal for connecting the caster to an item of furniture or to some other object. The caster also includes an axle bolt which extends through the housing transversely with respect to the journal opening and supports the wheels.

BACKGROUND OF THE INVENTION

In the case of known casters, the axle bolt is pressed directly into the caster housing. Since large forces are absorbed by the housing in the region of the axle bolt, for example shocks when traveling over a threshold or when the item of furniture is set down hard onto a caster, the axle receptacle of the housing can be easily deformed or damaged. For this reason, a high-quality and therefore more expensive plastic material is used for the production of the housing.

SUMMARY OF THE INVENTION

The object of the present invention is that of developing a caster of the type specified above which permits cost-effective production despite high mechanical strength in the region of the axle receptacle.

The caster according to the invention achieves this object. The caster according to the invention includes twinned wheels, a housing with a vertically oriented upper-side journal opening for holding a rotary journal for connecting the caster to an item of furniture or other object, and an axle bolt extending through the housing transversely with respect to the journal opening and supporting the wheels. The axle carrier is arranged in the housing and has a passage opening of a material with a greater strength than the housing.

The invention is based primarily on the idea that the greatest loadings of the caster occur in the region of the axle receptacle, but that parts of the housing which are remote from the axle receptacle are loaded to a much lesser extent and can therefore be composed essentially of a material which, although being of lower strength, is more cost-effective for this reason. It is therefore provided according to the invention that an axle carrier having a passage opening for the axle bolt is arranged in the housing, with the axle carrier being composed of a material with a higher strength than the housing. As a separate component, the axle carrier requires significantly less material than the rest of the housing, so that a higher-quality material can be used for the axle carrier than for the housing. The required strength of the region of the axle receptacle is therefore obtained at a lower cost than if the entire housing were produced from the higher-strength material. It is in principle possible for the axle carrier to be completely enclosed by the rest of the housing material, for example by means of a corresponding arrangement of the axle carrier in an injection-molding die for the housing. In a preferred embodiment of the invention, however, the housing has an outwardly open, duct-shaped axle carrier opening for holding the axle carrier. The housing and the axle carrier can then be produced independently of one another and joined together at any desired time.

In a further preferred embodiment of the invention, both the housing and also the axle carrier are composed of a plastic material, the housing for example of a polypropylene and the axle carrier of a polyamide. Alternatively, the axle carrier can also be composed of a metal, preferably of a zinc alloy or light metal alloy.

The axle carrier is expediently arranged in a force-fitting, cohesively joined and/or form-fitting manner in the housing. For example, the axle carrier is pressed in, adhesively bonded or welded to the housing.

The axle carrier can essentially have any desired cross-sectional shape, for example a rectangular or round cross section. Preferably the axle carrier has a substantially rectangular cross section with two integrally formed ribs which are arranged transversely with respect to the passage opening of the axle bolt. The housing can be prevented from being levered open under extreme loading if the axle carrier, in an alternative embodiment, has a substantially dumbbell-shaped cross section, with T-shaped end parts engaging into corresponding undercuts of the axle carrier opening.

In a further preferred embodiment of the invention, the axle bolt is pressed into the passage opening of the axle carrier, wherein in order to obtain a form-fitting and force-fitting engagement, the axle bolt can have a knurling or equivalent profiling on its part which is held in the axle carrier. A particularly secure seat of the wheels on the axle bolt is attained if the axle bolt is provided, on both sides of the housing, with two undercuts which are arranged spaced apart from one another and with which beads on the inner side of tubular hubs of the wheels are in engagement. The hubs of the wheels can extend axially into the region of the wall parts which delimit the axle carrier opening.

Recesses for the leadthrough of the axle bolt are expediently provided in those wall parts of the housing which delimit the axle carrier opening. The recesses should be larger than the cross section of the axle bolt, so that the axle bolt does not come into contact with the adjacent housing wall in the event of small deflections. The axle carrier opening is preferably arranged laterally offset with respect to the journal opening in the underside of the housing.

BRIEF DESCRIPTION OF THE DRAWINGS

The invention is explained in more detail below on the basis of the exemplary embodiments which are illustrated schematically in the drawing, in which.

DETAILED DESCRIPTION

Figure 1:
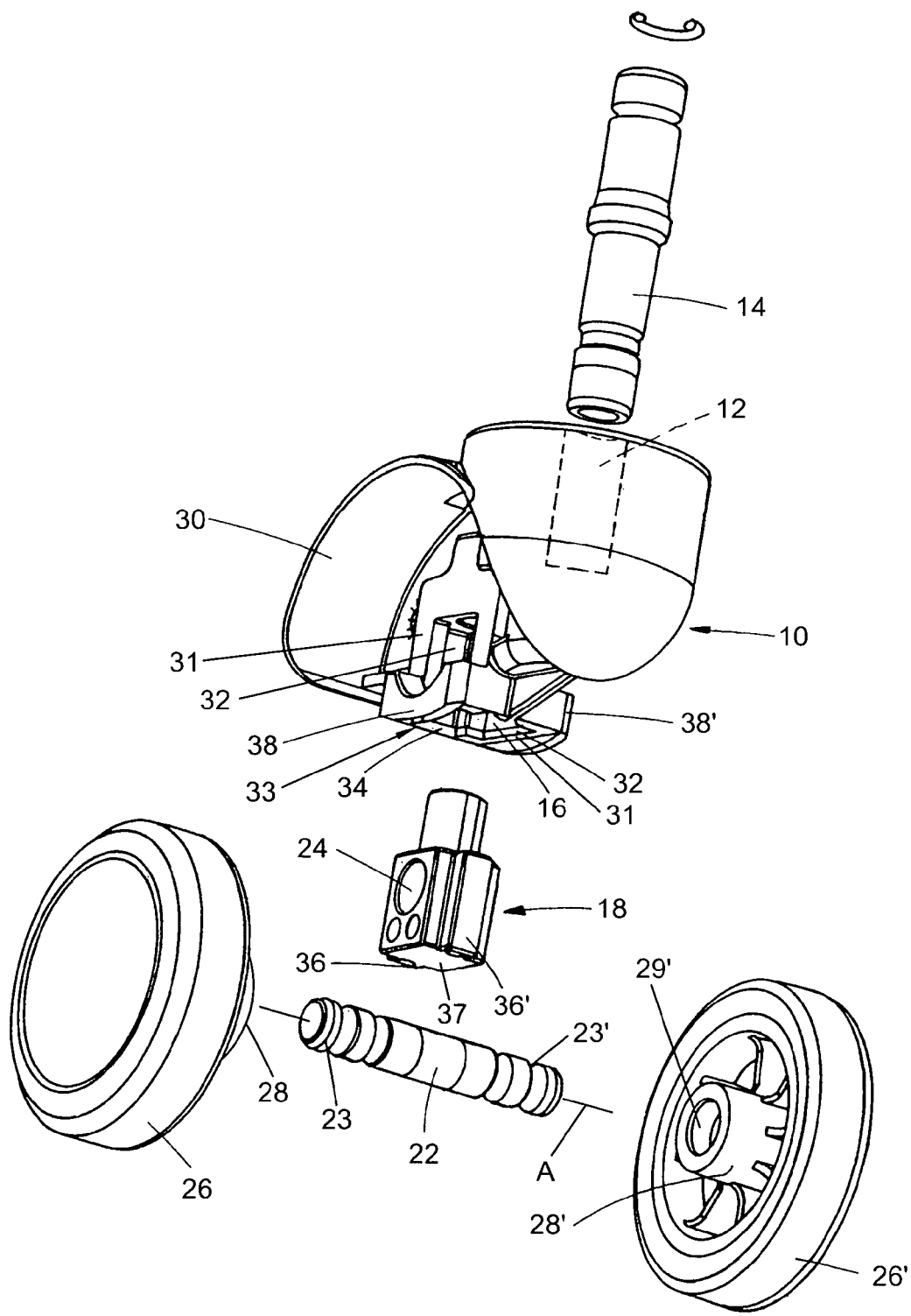
FIG. 1 shows a perspective exploded view of a free-running caster having twinned wheels and an axle carrier for holding the axle bolt.

The caster illustrated in the drawing is composed substantially of a housing 10 with a journal opening 12 for holding a rotary journal 14, by means of which the caster is rotatably fastened to an item of furniture or the like, an axle carrier opening 16 for holding an axle carrier 18, an axle bolt 22 which defines a longitudinal axis A and which is pressed into a passage opening 24 of the axle carrier 18 and is aligned transversely with respect to the axle carrier opening 16, and two wheels 26, 26' with tubular hubs 28, 28' which are plugged onto the free ends of the axle bolt 22 and rotate thereon. The wheels 26, 26' are composed of a wheel body with sprayed-on running faces composed of a material which is suitable for the application, for example of a soft material for use on a hard floor or a hard material for use on carpets or the like. A curved cover 30 of the housing 10 covers the upper region of the wheels 26, 26'.

The housing 10 has, in the region of the axle carrier opening 16 a wall structure including a pair of side walls 31 which limit the carrier opening 16 on opposite sides thereof. Recesses 32 through which the axle carrier 18 extends and which guide the latter are located in the respective side walls 31 for the leadthrough of the axle bolt 22. The wall structure of the housing 10 has a peripheral wall 33 at its lower side which defines the axle carrier opening 16 and surrounds the axle carrier 18. Axle carrier 18 may include a rectangular 37 or dumbbell-shaped cross-section. Transversely with respect to recesses 32, the housing 10 has grooves 34 into which ribs 36, 36' formed on the axle carrier 18 engage. This measure also serves for better guidance of the axle carrier 18 and increases the load capacity of the arrangement. At the lower end of the axle carrier opening 16, two projections 38, 38' project laterally from the respective housing walls 31. The projections 38, 38' form a lateral cover for the hubs 28, 28' and the housing region situated above the hubs 28, 28', so that an infiltration of dirt is prevented there. At the same time, the projections 38, 38' reinforce the housing 10 in the region of the axle carrier opening 16 in such a way that the housing part which holds the axle carrier 18 can be designed to be comparatively narrow. In this way, the hubs 28, 28' of the wheels 26, 26' can be designed to be particularly long and be guided into the region of the recesses 32. As a result, the hubs 28, 28' can have a relatively great holding depth for the axle bolt 22, which increases the stability and load capacity of the caster. Overall, it is possible by means of the measures to considerably reduce the material use in the production of the housing 10 while maintaining required load capacity values.

During the assembly of the caster, the axle carrier 18 is initially pressed or inserted and fixed into the axle carrier opening 16, so that the passage opening 24 for the axle bolt 22 is released and sufficient free space for the hubs 28, 28' of the wheels 26, 26' is provided between the axle bolt 22 and the projections 38, 38'. The axle bolt 22 is then pressed in a centered fashion into the passage opening 24. Finally, the wheels 26, 26' are pressed with their tubular hubs 28, 28' onto the axle bolt 22, with the hubs 28, 28' latching with beads 29' (only one of which is shown) into undercuts or grooves 23, 23' in the axle bolt 22. The insertion of the rotary journal 14 into the journal opening 12 can take place before or after the assembly of the axle carrier 18, of the axle bolt 22 and of the wheels 26, 26'.

In summary, the following is to be noted: the invention relates to a caster, in particular free-running caster, having twinned wheels 26, 26', the housing 10 with the substantially vertically aligned upper-side journal opening 12 for holding the rotary journal 14 which connects the caster to an item of furniture or to some other object, and the axle bolt 22 which extends through the housing 10 transversely with respect to the journal opening 12 and supports the wheels 26, 26'. In order to permit cost-effective production with sufficient load capacity in the region of the axle receptacle, it is proposed according to the invention that the axle carrier 18 having the passage opening 24 for the axle bolt 22 is arranged in the housing 10, and the axle carrier 18 is composed of material with a higher strength than the housing 10.

The invention claimed is:
1. A caster comprising:
   a pair of wheels;
   an axle bolt defining a longitudinal axis and supporting said wheels adjacent respective opposite ends of said axle bolt;
   a housing having an upper side defining therein a substantially vertically oriented journal opening, a lower side defining therein an axle carrier opening, and an axle bolt opening oriented transversely to said journal opening;
   a rotary journal disposed in said journal opening and configured for connecting said caster to an item of furniture or other object; and
   an axle carrier defining a passage therein oriented transversely to said journal opening, said axle carrier being force-fitted or press-fitted into said axle carrier opening such that the axle carrier is fixed within the axle carrier opening and said axle bolt opening of said housing is aligned with said passage, said axle bolt extending through said passage of said axle carrier and through said axle bolt opening of said housing, said axle bolt being press-fit in said passage of said axle carrier to prevent movement of said axle bolt relative to said axle carrier, said axle carrier being a separate component from said housing and being composed of a material having a greater strength than a material from which said housing is composed.

2. The caster of claim 1, wherein said axle carrier opening is laterally offset relative to said journal opening.

3. The caster of claim 1, wherein said housing is composed of polypropylene and said axle carrier is composed of polyamide.

4. The caster of claim 1, wherein said housing is composed of plastic and said axle carrier is composed of metal.

5. The caster of claim 4, wherein said housing is composed of polypropylene and said axle carrier is composed of a metal alloy.

6. The caster of claim 5, wherein said axle carrier is composed of zinc alloy.

7. The caster of claim 1, wherein said housing defines therein a pair of grooves on opposite sides of said axle carrier opening, said axle carrier defining thereon a pair of guide ribs formed integrally with said axle carrier on opposite sides thereof and extending transversely with respect to said passage, said guide ribs being engaged within the respective said grooves.

8. The caster of claim 1, wherein each said wheel includes a tubular-shaped hub on an inner side thereof, each said hub having an inner circumference defining thereon a bead, and each said end of said axle bolt including an undercut in which said bead of one of said wheels is engaged.

9. The caster of claim 1, wherein said axle carrier wholly surrounds said axle bolt in an area of said axle carrier which defines said passage such that said axle carrier is the primary load-bearing component for said axle bolt.

10. The caster of claim 1, wherein said rotary journal is supported solely within said journal opening of said housing and not within said axle carrier.

11. A caster comprising:
   a pair of wheels;
   an axle bolt defining a longitudinal axis and supporting said wheels adjacent respective opposite ends of said axle bolt, said axle bolt having an outer contour;
   a housing having an upper side defining therein a substantially vertically oriented journal opening, said housing having a pair of spaced-apart side walls between which an axle carrier opening is defined, each said side wall defining a recess therein which opens axially;
   a rotary journal disposed in said journal opening and configured for connecting said caster to an item of furniture or other object; and
   an axle carrier defining a passage therein oriented transversely to said journal opening, said axle carrier being force-fitted or press-fitted into said axle carrier opening axially between said side walls such that the axle carrier is fixed within the axle carrier opening and said recesses of the respective said side walls are aligned with said passage, said axle bolt extending through said passage of said axle carrier and under said recesses in said side walls on opposite sides of said passage, said axle carrier being a separate component from said housing and being composed of a material having a greater strength than a material from which said housing is composed, and said axle carrier passage conforming to said outer contour of said axle bolt in an area of said axle carrier which defines said passage such that said axle carrier is the primary load-bearing component for said axle bolt.

12. The caster of claim 11, wherein said housing has a lower side spaced from said upper side, said axle carrier opening opens downwardly through said lower side and said journal opening opens upwardly through said upper side, said axle carrier opening being laterally offset relative to said journal opening.

13. The caster of claim 11, wherein said housing is composed of plastic and said axle carrier is composed of metal.

14. The caster of claim 11, wherein said housing defines therein a pair of grooves disposed transversely between said side walls on opposite sides of said axle carrier opening, said axle carrier defining thereon a pair of guide ribs formed integrally with said axle carrier on opposite sides thereof and extending transversely with respect to said passage, said guide ribs being engaged within the respective said grooves.

15. The caster of claim 11, wherein each said wheel includes a tubular-shaped hub on an inner side thereof, each said hub having an inner circumference defining thereon a bead, and each said end of said axle bolt including an undercut in which said bead of one of said wheels is engaged.

16. The caster of claim 11, wherein said housing has a lower side spaced from said upper side, said housing includes a peripheral wall at said lower side which defines said axle carrier opening and said axle carrier opening opens downwardly through said peripheral wall, said side walls of said housing forming part of said peripheral wall, and said axle carrier being surrounded by said peripheral wall of said housing when disposed within said axle carrier opening.

17. The caster of claim 16, wherein said peripheral wall of said housing defines therein a pair of grooves disposed transversely between said side walls on opposite sides of said axle carrier opening, said axle carrier defining thereon a pair of guide ribs on opposite sides thereof and extending transversely with respect to said passage, said guide ribs being engaged within the respective said grooves.

18. The caster of claim 1, wherein said axle carrier, in an area of said axle carrier which defines said passage, conforms to a shape of said axle bolt such that said axle carrier is the primary load-bearing component for said axle bolt and receives the greatest loading on said caster at all times.

19. The caster of claim 11, wherein said axle carrier wholly surrounds said axle bolt in said area.

20. The caster of claim 11, wherein said axle carrier receives the greatest loading on said caster at all times.

21. A caster comprising:
a pair of wheels;
an axle bolt defining a longitudinal axis and supporting said wheels adjacent respective opposite ends of said axle bolt;
a housing having an upper side defining therein a substantially vertically oriented journal opening, a lower side defining therein an axle carrier opening, and an axle bolt opening oriented transversely to said journal opening;
a rotary journal disposed in said journal opening and configured for connecting said caster to an item of furniture or other object; and
an axle carrier defining a passage therein oriented transversely to said journal opening, said axle carrier being adhesively bonded or welded within said axle carrier opening such that said axle bolt opening of said housing is aligned with said passage, said axle bolt extending through said passage of said axle carrier and through said axle bolt opening of said housing, said axle bolt being press-fit in said passage of said axle carrier to prevent movement of said axle bolt relative to said axle carrier, said axle carrier being a separate component from said housing and being composed of a material having a greater strength than a material from which said housing is composed.

22. A caster comprising:
a pair of wheels;
an axle bolt defining a longitudinal axis and supporting said wheels adjacent respective opposite ends of said axle bolt, said axle bolt having an outer contour;
a housing having an upper side defining therein a substantially vertically oriented journal opening, said housing having a pair of spaced-apart side walls between which an axle carrier opening is defined, each said side wall defining a recess therein which opens axially;
a rotary journal disposed in said journal opening and configured for connecting said caster to an item of furniture or other object; and
an axle carrier defining a passage therein oriented transversely to said journal opening, said axle carrier being adhesively bonded or welded within said axle carrier opening axially between said side walls such that said recesses of the respective said side walls are aligned with said passage, said axle bolt extending through said passage of said axle carrier and under said recesses in said side walls on opposite sides of said passage, said axle carrier being a separate component from said housing and being composed of a material having a greater strength than a material from which said housing is composed, and said axle carrier passage conforming to said outer contour of said axle bolt in an area of said axle carrier which defines said passage such that said axle carrier is the primary load-bearing component for said axle bolt.

23. The caster of claim 1, wherein the axle carrier is pressed in and adhesively bonded or welded to the housing.

24. The caster of claim 11, wherein the axle carrier is pressed in and adhesively bonded or welded to the housing.

* * * * *